July 26, 1966 Z. J. J. STEKLY 3,263,133

SUPERCONDUCTING MAGNET

Filed Aug. 27, 1962 2 Sheets-Sheet 1

ZDENEK J.J. STEKLY
INVENTOR.

BY Alden D. Redfield
Melvin E. Frederick
ATTORNEYS

July 26, 1966 Z. J. J. STEKLY 3,263,133

SUPERCONDUCTING MAGNET

Filed Aug. 27, 1962 2 Sheets-Sheet 2

ZDENEK J.J. STEKLY
INVENTOR.

BY Alden D. Redfield
Melvin E. Frederick
ATTORNEYS

United States Patent Office 3,263,133

Patented July 26, 1966

3,263,133

SUPERCONDUCTING MAGNET

Zdenek J. J. Stekly, Topsfield, Mass., assignor to Avco Corporation, Cincinnati, Ohio, a corporation of Delaware Filed Aug. 27, 1962, Ser. No. 220,237
9 Claims. (Cl. 317—123)

The present invention relates to superconducting magnets and more particularly to superconducting magnets for providing high magnetic field strengths.

The ability to not only provide high magnetic fields but to effectively and safely provide such magnetic fields over an extended period of time is important in connection with solid state, plasma and particle physics research. In most cases, heretofore, the need for high magnetic fields necessitated the use of pulsed fields. However, with the advent of new superconducting materials, considerable interest has been aroused in the development of useful magnets of high-field strength of a size that would be useful in applications where high magnetic field strengths are required.

An example of the application of such magnets is the generation of electrical power, magnetic radiation shielding in outer space, plasma propulsion, large scale physics experiments and the like. Providing a continuous magnetic field of high-field strength over large volumes is a formidable engineering task.

Broadly speaking, three types of field coils may be used to provide high-strength magnetic fields namely, room temperature copper, cryogenic, and superconducting field coils. Until recently, the only practical way to produce high-strength magnetic fields, was by using water-cooled copper field coils with or without iron cores. This type of field coil has large power requirements.

Since the resistivity of pure metals decreases with temperature, Joule loss in field coils can be reduced by refrigeration. Although this approach requires that power be supplied to the refrigerator, it has been shown that the total power consumed by the refrigerator and a cryogenic field coil can be substantially reduced over that required by a comparable copper magnet operating at room temperature.

Recent developments in high critical field superconductors have made possible the consideration of high-field strength superconducting field coils. The possibility of using superconductor field coils for providing 50 kilogauss or more with only minute refrigeration power requirements and no Joule losses presents obvious advantages for continuously operating power plants and the like.

The properties and characteristics of superconductors have been treated in such texts as "Superfluids," vol. I, by Fritz London, published in 1950 in New York by John Wiley & Son, Inc., and "Superconductivity" by D. Shoenberg, published in 1952 in London by Cambridge University Press.

In general, a superconductor is a metal, an alloy or a compound that is maintained at very low temperatures, i.e., from about 17° K. to the practical attainability of absolute zero, in order that it may present no resistance to current flow therein.

It has been known for many years that the resistance of metals decreases as a function of decreasing temperature until a given temperature of the order of 18° K. or below is reached, at which temperature electrical resistance very sharply vanishes for those materials which exhibit superconductivity. The temperature at which transition to zero resistance takes place is referred to as the critical temperature and the state of a material upon reaching zero resistance is referred to as that of a superconductor. A material that does not or cannot be made to exhibit zero resistance may be referred to as a non-superconductor.

The critical temperature varies with different materials and for each material it is lowered as the intensity of the magnetic field around the material is increased from zero. Once a body of material is rendered superconductive, it may be restored to the resistive or normal state without changing its temperature by the application of a magnetic field of a given intensity to such materials. The magnetic field necessary to destroy superconductivity is called the critical field. Further, at a given magnetic field strength and temperature a superconductive material may also be driven into its normal state by passing a current of a given magnitude through the material. The current necessary to destroy superconductivity is called the critical current.

Thus, superconductivity in a specific material may be destroyed by the application of energy to it in the form of heat so as to make such material reach its critical temperature, or in the form of a magnetic field so as to make it reach its critical field, or in the form of current so as to make it reach its critical current. The critical temperature, field and current are all interdependent.

Although materials, such as $Nb_3Sn$ and $V_3Ga$ hold the promise of being utilized in superconducting magnets of 200 kilogauss or high-field strengths, at present, the only practical materials that are readily useable and available are alloys of the niobium-zirconium system. As compared to copper, the resistance of suitable and presently available superconductive materials is quite high in the normal state.

The general behavior of short samples of the niobium-zirconium system is that as the zirconium content is increased, the critical field increases, while the current-carrying capacity decreases. A maximum critical field occurs at high zirconium contents, and then decreases sharply at very high percentages of zirconium.

If a superconducting wire is wound into a coil, in general, the wire will not carry the same amount of current as it will in short lengths. Long lengths of the 25% zirconium alloy .010 inch in diameter will carry about 20 amperes up to about 60,000 gauss but does not increase its current-carrying capacity as the field is lowered. The difference between the current-carrying capacity in long and short lengths becomes less pronounced as the zirconium content is increased.

The useable critical field of 25% zirconium alloy (25% zirconium, 75% niobium) is in the neighborhood of 60 kilogauss while that of 33% zirconium alloy is about 5–10 kilogauss higher. 50% zirconium alloy is reported to have critical fields even higher.

When a portion of a superconducting wire carrying current goes normal, a voltage is developed across and energy is dissipated in the normal portion of the wire. If the energy dissipated in the normal portion of the wire is sufficiently high, this may result in a change in the superconducting characteristics of the wire or destruction of the wire by melting. If the voltage developed across the normal portion is sufficiently high in the case of an insulated wire, the insulation may break down and cause internal shorting. The internal short may in turn cause arcing and consequently hot spots. Further, if the short circuit is of a permanent nature, then the current distribution in the coil will be changed, thereby resulting in concentration of the magnetic field within the coil during subsequent start ups. This is undesirable, since a local concentration of the magnetic field causes a decrease in performance due to lower current-carrying capacity at high-field strengths.

On the other hand, if there is a short circuit in the coil which opens up during start-up, this is equivalent to suddenly switching in a portion of the coil which was previously unused. Due to tight coupling, this may be effective to drive a portion of the coil normal.

The amount of energy stored in some proposed large superconducting coils is measured in tens of megajoules. If a coil storing such tremendous energies becomes normal in an uncontrolled manner, complete destruction of the coil, as well as its immediate surroundings, is quite likely to result.

It is therefore of primary importance to provide protective circuitry to protect superconducting coils in the event that they become normal.

In accordance with the present invention, high-field strength superconducting coil windings may be provided with fail-safe features by coating the superconductive wire with a low resistance metal such as copper and then with a high resistance material (insulator), by providing other low resistance shunts across segments of the coil whereby the current in each shunt may independently go to zero, and/or by providing inductive shields around segments of the coil which tend to maintain the magnetic flux constant thereby permitting the current in the coil windings themselves to decay with a minimum energy associated with the current decay.

It is therefore the principal object of the present invention to provide a superconducting coil with fail-safe features.

Another object of the present invention is to provide high-field strength superconducting coils that may be safely used in applications where high magnetic field strengths over large volumes are required.

Another object of the present invention is to provide a high-field strength superconducting coil which does not require an excessively long start-up time wherein the coil winding is protected in the event a portion goes normal.

A still further object of the present invention is the provision of a high-field strength superconducting coil wherein if it is driven into its normal state the magnetic energy may be dissipated without damage to the windings.

The invention, both as to its organization and method of operation will best be understood from the following description of specific embodiments when read in conjunction with the accompanying drawings in which.

In the design of superconducting coils, attention must be given to the provision of a cryogenic environment for the coil at liquid helium temperatures, the use of materials that exhibit superconducting properties within the desired range of temperatures, currents, and magnetic fields, and protection of the windings in the case of transition of a portion or portions of the coil into the normal region during start up or normal operation.

The provision of a cryogenic environment by means of a dewar or the like containing, for example liquid helium, is well known in the art and in most cases is merely a straightforward engineering problem. Thus, the present invention is not directed to the provision of a cryogenic environment for a superconducting coil nor is it directed to the provision of suitable superconducting materials, such as, for example, the niobium-zirconium alloys. The present invention is directed, however, to the provision of means for preventing damage to a superconducting coil and, particularly, one having a large amount of energy stored in the magnetic field in the event a portion of such a coil goes normal during or after start up.

Figure 1:
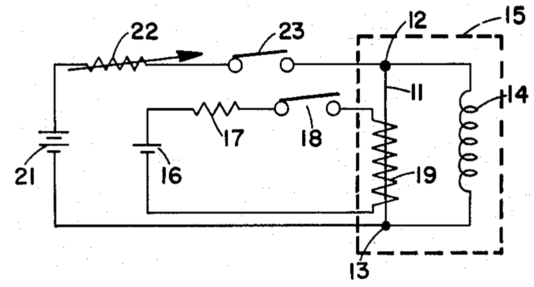
PRIOR ART FIG 1
FIGURE 1 is a schematic diagram illustrating a superconducting coil and conventional associated circuitry for providing a persistent magnetic field.

Consider now by way of introduction FIGURE 1 which is a schematic representation of a conventional circuit for establishing a persistent magnetic field. As shown in FIGURE 1, a persistent current shunt 11 is connected across the terminals 12–13 of a superconducting coil 14, both of which are contained in a dewar 15 filled, for example, with liquid helium to provide the necessary cryogenic temperatures. A source of current 16, current limiting resistor 17 and switch 18 are connected in series with each other and a heater 19 wound around the persistent current shunt 11. The persistent current shunt 11 is composed of a superconductive material. The heater 19 is comprised of a nonsuperconductive material, i.e., one that remains normal at all times. The main source of current 21, a current limiting variable resistor 22 and main power switch 23 are connected in series with each other and with the parallel combination comprising the superconducting coil 14 and persistent current shunt 11.

The first step in starting up the superconducting coil 14 is to close both the heater switch 18 and the main power switch 23. When current is flowing through the heater 19, the persistent current shunt 11 is heated beyond its critical temperature and thus exhibits a normal resistance. This allows the current from the main power source 21 to flow through the superconducting coil 14 and energize it. Once the coil 14 is energized the heater switch 18 is opened and the superconducting shunt 11 allowed to cool down and become superconductive. After the shunt 11 becomes superconductive, the main power switch 23 is opened and current continues to flow through the coil 14 and its persistent current shunt 11. If no resistance exists in the series circuit consisting of the superconducting coil and its persistent current shunt, the current will flow indefinitely and no decay in the magnetic field will occur. If, however, a resistance is present for any reason then the current, and consequently the magnetic field will decay with a time constant dependent on the total resistance in the circuit. If desired, the current source 16, resistor 17, heater 19, and persistent current shunt 11 may be omitted and current from source 21 may be continuously supplied to the coil 14.

Generally, it is not necessary, at least as a matter of safety, to protect the windings of small superconducting coils (coils storing less than about 200 joules in the magnetic field) because the energy stored therein is small and easily dissipated by the cryogenic environment. However, the amount of energy stored in large superconducting coils now contemplated may be as much as thousands of megajoules. As has been pointed out, if a coil storing such tremendous energies becomes normal in an uncontrolled manner, destruction of the coil as well as its immediate surroundings will result.

In accordance with the present invention, irrespective of the configuration of the conductor used, the windings of a superconducting coil may be protected during transition from the superconducting state to the normal state by coating the superconducting wire first with a low resistance material such as copper, and then with a high resistance insulating material, providing additional conductive or shunt circuitry for segments of the coil and/or providing inductive shields around segments of the coil.

For the case of a superconducting coil wound with either uncoated superconducting wire or with superconducting wire coated with a low resistance material only (no insulation) the equivalent electrical circuit for this case is an inductor which is shorted out with a resistor having a low resistance. Consequently, the coil will have a very long time constant. Such a coil is fully protected from damage during the shut down process resulting from the appearance of a normal region since no sizable voltages can develop because every point on the inductor is connected to every other point on the inductor and there are no discrete, lumped inductances that must discharge into a resistance across them. However, while protection is provided during shut down, the start-up time required for such a coil becomes excessive due to the very long time constant of the coil. The time constant varies approximately as the diameter of the coil to the third power, and consequently, the start-up time increases very rapidly for even small increases in the diameter of the coil.

Coating of the superconducting wire first with a low resistance material and then with a high resistance material has definite advantages. The net effect on the voltages generated across a normal portion is beneficial when the wire is coated with a low resistance material since the lower resistance per unit length in the normal state results in a slowing down of the rate of resistance rise which in turn yields a slower decay time. Further, the low resistance coating allows the current to flow in the wire in its normal state for a longer time than if the coating was not present.

The outermost coating of a high resistance material improves the start-up time requirements. Thus, because of the excessive start-up time inherent with the use of either bare (uncoated) superconducting wire or superconducting wire coated with a low resistance metal only, the advantages of a superconducting wire coated with a low resistance metal may be realized only if the low resistance metal is covered with a truly insulating material such as, for example, Teflon, nylon and the like.

Figure 2:
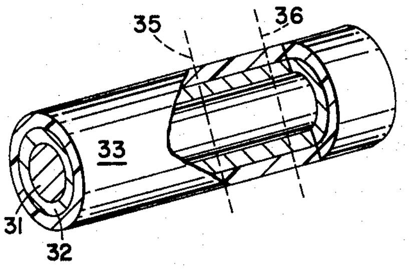
FIGURE 2 is a pictorial illustration of a portion of a coated superconductive wire in accordance with the present invention with a portion of the coating broken away.

A portion of a superconductive wire 31 coated with a low resistance metal 32 which in turn is coated with a high resistance insulative material 33 is shown in FIGURE 2. Thus, if a winding comprising a plurality of turns forming a plurality of layers is formed from the wire 31 in conventional manner, and a segment of the wire 31, assumed for purposes of illustration to be located between the broken lines 35 and 36 goes normal, the metal coating 32, among other things, provides an electrical shunt across such a segment or segments if there be more than one.

Figure 3:
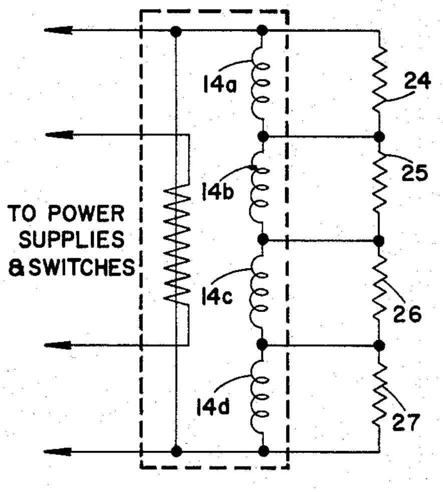
FIGURE 3 is a schematic diagram of a superconducting coil with the conductive or shunting circuitry in accordance with the present invention.

Consider now FIGURE 3 which is a schematic representation of the provision of conductive or shunting circuitry comprising resistances which are preferably, although not necessarily, disposed exterior of the coil and/or cryogenic environment in accordance with the present invention. For purposes of clarity, the power supplies and persistent current switches of FIGURE 1 have been omitted. As may be seen from FIGURE 3, the superconducting coil 14 is illustrated as being comprised of segments **14*a*–14*d* shunted respectively by low resistances 24–27. The size of the segments 14*a*–14*d* may vary and comprise either less than or more than one layer of the coil. Thus, it will now be seen that the superconducting coil 14** has effectively been separated into a plurality of segments whose currents can independently go to zero by reason of the resistance which shunts each segment. The provision of the shunting resistances separates the coil into segments so that the energy per segment is not greater than an allowable amount as determined by the design and operating conditions of the coil. The number of segments or shunts is determined by the maximum allowable energy per segment. The shunt for each segment of the coil whether a coating on the wire or resistances, should be of the nonsuperconductive type. Location of the shunting resistances within the coil winding is less desirable than location exterior of the coil because of the dissipation of energy within the winding.

The use of conductive or shunting circuitry external of the coil is satisfactory when the segments of the coil are uncoupled inductively as when the coil winding is disposed on a series of spools; however, as the inductive coupling between the segments of the coil winding increases, a collective, inductive phenomenon occurs.

Figure 4:
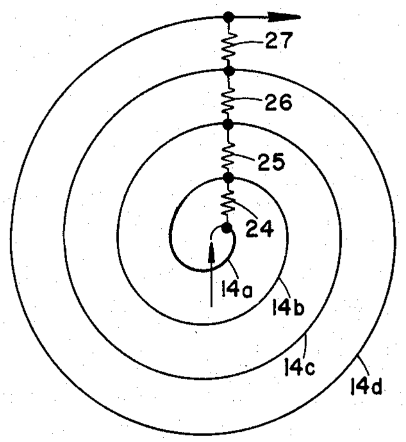
FIGURE 4 is a slightly different schematic diagram of a superconducting coil with protective circuitry as disclosed in FIGURE 3.

The collective, inductive phenomenon is best described by referring to FIGURE 4 which schematically shows coil 14 in the form of a solenoidal-type coil wherein equal segments **14*a*–14*d* are connected by resistive shunts 24–27, preferably located external of the coil winding. The arrows represent current flow through the coil winding. If a portion of the innermost segment 14*a* goes normal, current flow through segment 14*a* decays to zero and the current previously flowing through segment 14*a* is diverted through the innermost shunt 24 by reason of its low resistance as compared to that of the normal portion. However, during the decay transient, the adjacent segment 14*b* which is shunted with a shunt 25 tends to double its current due to inductive coupling between segments or layers as the case may be. Since segment 14*b* is superconductive and quite likely operating near its critical current, the current flow through segment 14*b* will increase to its critical value and drive it normal. The third segment 14*c* which previously had been shielded from what was happening in the first or innermost segment 14*a* by the second segment 14*b*, suddenly is faced with the necessity to triple its current to keep the flux constant. Under these circumstances, the third segment 14*c*** must of necessity go normal. This cumulative process is repeated in all segments of the coil winding. Thus, the situation gets progressively worse and currents much larger than were initially flowing can be induced in the coil winding resulting in higher voltages and energy dissipations per unit length than would result if all of the segments were not inductively coupled. Clearly, where conductive protection circuitry per se is used, care must be exercised to prevent the collective, inductive behavior described above.

It is now appropriate to discuss means in accordance with the present invention for preventing the aforementioned collective, inductive behavior.

Figure 5:
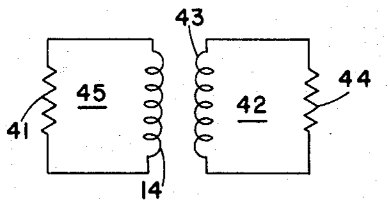
FIGURE 5 is a schematic diagram of a superconducting coil with inductive circuitry in accordance with the present invention.

Consider now FIGURE 5 which illustrates the principle of inductive protective circuitry in accordance with the present invention. A normal region 41 is illustrated in FIGURE 5 as being in series with a superconducting coil 14 which is inductively coupled to a protective circuit 42 comprising a coil 43 in series with a nonsuperconductive resistance 44. If a normal region 41 appears in the superconducting circuit 45 as shown in FIGURE 5 and the magnetic flux begins to decrease, the protective circuit 42 will tend to hold the flux constant, allowing the superconducting circuit 45 to decay with a minimum energy associated with its decay. The protective circuit 42 thereafter decays with the time constant of the protective circuit itself. The degree of protection afforded by the protective circuit 42 depends on the coupling coefficient between the two circuits as well as on their relative time constants.

Since the inside and outside diameters of a solenoidal-type coil are easily accessible, inductive shields, for example, formed of sheets of low resistance nonmagnetic material or conventional wire coils may be easily provided to act as inductive shields to minimize the energy dissipated in the windings themselves. Stating it another way, the shields inhibit an increase in the flow of current in the coil windings due to inductive coupling during transients.

Figure 6:
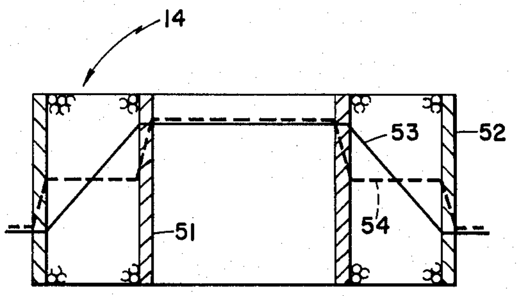
FIGURE 6 is a sectional view of a superconducting coil showing the flux distribution in an inductively protected coil.

This effect is illustrated in FIGURE 6 which shows by way of example a superconducting coil 14 with a cylindrical inner inductive shield 51 and a cylindrical outer inductive shield 52 formed of suitable sheet material such as, for example, copper. The initial flux distribution for the coil during normal operation is shown by the solid line 53. If now, a normal point appears and the current in the windings goes to zero rapidly compared with the time constant of the inductive shields, the flux distribution after this initial transient is illustrated by the broken line 54. As is clearly shown in FIGURE 6, the flux distribution exterior of the inductive shields 51 and 52 is the same immediately after the initial transient as it was during normal operating whereas the flux distribution through the windings is constant rather than increasing. For a coil winding, for example, whose outside radius is equal to twice the inside radius and which is inductively protected, the energy that must be dissipated in the windings during the aforementioned initial transient is only 13 percent of the total energy stored in the coiled winding.

The energy that must be dissipated in the windings during the initial transient can be reduced even further by providing more shields spaced within the windings. For example, in addition to inner and outer shields, an inductive shield may be provided between each layer of the coil.

Returning now to the collective, inductive behavior that occurs in the transition to the normal state when only conductive protective circuitry is used as disclosed in connection with FIGURES 3 and 4, attention is particularly directed to FIGURE 4. It will now be seen that the main difficulty lies in the fact that if the first segment 14*a* goes normal, the second segment 14*b* must double its current to keep the flux constant. However, if, for example, a thin inductive shield of highly conductive material, such as copper, is provided between the segments 14*a* and 14*b*, then the copper shield, whether of sheet material or a coil, can be sized to take up most of the current increase previously required of the second segment and thereby stop the accumulative, inductive propagation of the normal region. Further, since the energy in the copper shield is dissipated uniformly throughout the shield volume, the thermal disturbance to the outer segments is minimized. The propagation of the normal region may thereby be completely arrested in which case the remainder of the coil will discharge through the shunt (or shunts) across the normal region with a very long time constant equal to effectively the total inductance of the superconductive coil divided by the resistance of the resistive shunt across the normal portion.

Figure 7:
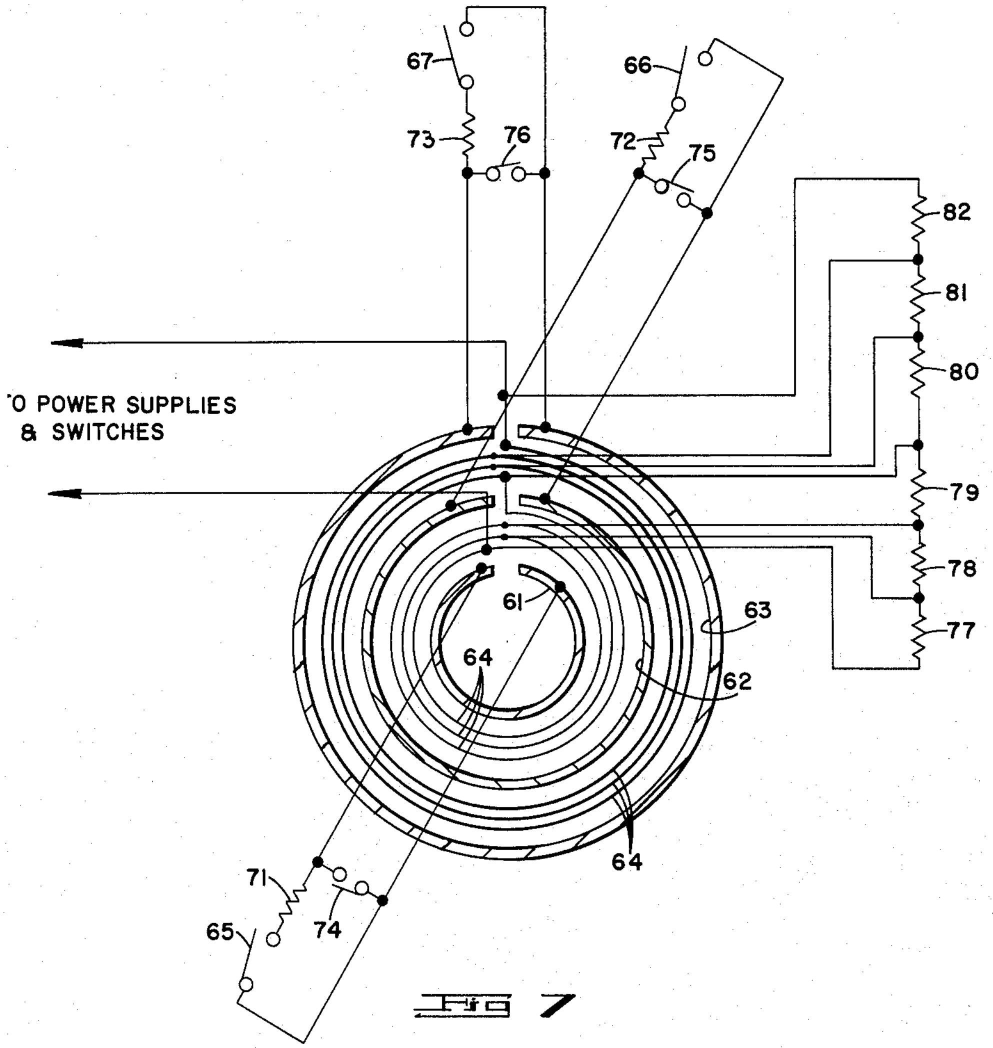
FIGURE 7 is a partly schematic and partly pictorial representation of a superconducting coil in accordance with the present invention.

Consider now FIGURE 7 which illustrates by way of example a superconducting coil in accordance with the present invention. As shown in FIGURE 7, a plurality (three) of highly conductive, nonmagnetic and cylindrical shields 61–63 formed, for example, of copper are provided between a plurality of layers 64 of the superconducting coil. The dewar and persistent current switch have been omitted for clarity. As illustrated in FIGURE 7, three layers 64 of the superconducting coil are enclosed between adjacent inductive shields. The number of layers enclosed by adjacent shields may vary from one to more than three. Each shield is cut to provide adjacent and longitudinally disposed ends which are connected in series with respectively switches 65–67 and resistances 71–73. Also shown are shorting switches 74–76 connected across respectively the longitudinally spaced ends of each shield. Shunting resistors 77–82 are connected between the layers of the coil winding in the manner disclosed in connection with FIGURE 3. As will now be apparent, the shields 61–63 function to tend to maintain the total flux constant for a given amount of time and to slow down and maximize the time required for shut down. Shut-down time will be maximum if the shields are shortcircuited by the shorting switches 74–76 or, alternately, are not cut and therefore comprise a shortcircuited electrical path to current induced therein. This arrangement results in maximum heating of the copper shields within the coil which may not be desirable in certain cases. Thus, in other cases, it may be desirable to locate the resistances 71–73 exterior of the coil or the dewar, as illustrated in FIGURE 7.

Use of the resistances 71–73, increases the resistance in the inductive circuits and thereby decreases their effect. The provision of resistance in the inductive circuits does, however, permit dissipation exterior of the coil of a substantial portion of the energy induced in the inductive shields during shut down. The value of this resistance should be high compared to that of the inductive shields but not so high as to significantly limit the current that can flow in the shields. Alternately, as noted above, resistance in the inductive circuits may be omitted and the shields may be made integral to provide a shortcircuited electrical path to current induced therein.

The effect of inductive shields is most important where the superconducting material is operated near its critical point, i.e., the point at which a small amount of additional current will create sufficient flux to drive the superconducting material normal. Because of the current induced in the inductive shields during shut down, the shields tend to maintain the total flux constant and thereby prevent the superconducting material from being driven normal.

Figure 8:
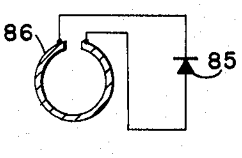
FIGURES 8 and 9 illustrate modifications of the present invention.

The presence of inductive shields not only facilitates shut down of a superconducting coil but also provides thermal insulation at superconducting temperatures between layers of the coil. Further, diodes may advantageously be utilized in connection with the inductive shields or shunting resistances. Thus, as shown in FIGURE 8 by way of example, diodes may be substituted for the resistances and switches associated with the inductive shields illustrated in FIGURE 7. By way of example, a diode 85 is shown in FIGURE 8 connected in series with member 86 which is representative of an inductive shield or segment of the coil winding.

Thus, each inductive circuit and/or resistive shunt may be provided with one or more diodes poled to present a low resistance to current flow during shut down and a high resistance to current flow during start up. This is easily achieved since current flow during start up will be opposite to the current flowing during shut down. As will now be apparent, for example, diodes in the inductive circuits will automatically and instantaneously provide the desired resistance in the inductive circuits without the necessity of the provision of switches, sensing apparatus and the like.

Figure 9:
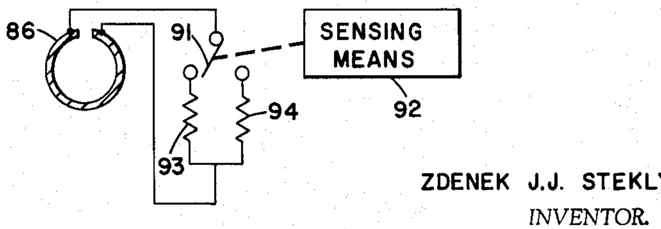

In view of the preceding discussion, those skilled in the art will readily appreciate that a mechanical counterpart and equivalent of the diodes may be easily provided as shown in FIGURE 9. As shown in FIGURE 9, the diode of FIGURE 8 has been replaced by a switch 91 operable either manually or automatically by means of suitable sensing means 92 to connect either a low resistance 93 or a high resistance 94 in series with member 86 as determined by conditions within the coil and/or the supply of current to the coil. The arrangement shown in FIGURE 9 duplicates the action of the diode shown in FIGURE 8.

While quite short, a finite amount of time is required for the current in a defective segment to be transferred through a shunting resistance to the next segment. In the absence of inductive shields if the segment next adjacent the defective segment is near its critical value, the increase in current flow thereto may well drive this segment normal and so on throughout the coil. The inductive shields as pointed out hereinbefore tend to hold the total flux constant and thereafter permit the flux to decrease at an acceptable and safe rate.

If the release time with the inductive shields is made sufficiently long, and a plurality of segments are provided between adjacent shields as illustrated in FIGURE 7, each of these segments (or layers) will take up only a proportionate share of the current that would otherwise flow in the segment or segments adjacent the defective segment. In this way, the possibility of the adjacent segment being driven normal may be greatly reduced. Since the entire coil is now no longer in a superconducting condition with a normal region present, the current must flow through a resistance (the shunting resistance across the normal segment of the coil), the entire coil will shut down at an acceptable rate; i.e., one that will not result in destruction or damage to the coil.

During the shut down process, a small amount of the energy stored by the coil winding will be dissipated in the superconducting material and its coating; a substantial amount will be dissipated in the shunting resistance across a defective segment; and the balance, a substantial amount, will be dissipated in the inductive shields and/or any resistances connected in series therewith.

Shunts may be provided in any of a number of suitable ways. For example, they may be comprised of a part of the wire with which the coil is wound such as, for example, a coating, resistances exterior of the coil and/or its dewar, or a combination of both. Further, diodes or their mechanical equivalent may be substituted for the shunting resistances 77–82 in the manner disclosed in connection with FIGURES 8 and 9. Thus, it will be obvious that with properly poled diodes or their mechanical equivalent in the external shunts, there will be provided in these shunts a high resistance during start up and a low resistance during shut down. This is a desirable feature because, as is also the case with the magnetic shields, it decreases start-up time and increases shut-down time as compared to a coil not having such features or one having fixed resistances.

Whereas the provision of shunts is important, the particular manner in which they are provided is not. The resistance of the shunts between segments will be minimum if the coil is formed of uninsulated superconducting wire. In this case, contact resistance between turns and between layers will be substantially zero. While this will result in a minimum resistance which is advantageous during shut down, it will also result in a practically infinite start-up time.

Maximum resistance will be provided by the omission of the shunting resistances and by completely insulating the superconducting wire whether coated with a low resistance metal or not. In this case, contact resistance is infinite. This will provide a minimum start-up time and minimum protection if a portion of the superconducting coil goes normal. The most satisfactory approach is, of course, not found at the extremes but somewhere between these two extremes. For example, part or all of the superconducting wire may be coated only with a resistive material to provide a predetermined amount of contact resistance. Insulation may be provided between turns and layers of either coated or uncoated wire or the superconducting wire may be first coated with a material having a predetermined resistivity and thereafter coated in part with a truly insulating material. Further, any reasonable combination or permutation of the above possibilities may be utilized per se or in combination with shunting resistances disposed exterior of the coil and connected serially between the adjacent segments which may comprise a portion of a layer, a complete layer, or a plurality of layers.

As may now be evident, the particular manner in which the resistance between segments is provided is not material to the invention. However, the value of resistance as determined in conventional manner must in every case provide a reasonable start-up time and the requisite amount of fail-safe protection.

The effect on a superconductive coil of protective circuitry in accordance with the present invention is to slow down the transients within the coil. This means that start-up time increases as more protection is provided. Although specific time constants of coils in accordance with the present invention depend on coil design and thus cannot be given a time constant for a coil having an inside diameter of five inches and producing 50,000 gauss is of the order of ten seconds. The start-up time of a coil must be many times the time constant of the coil to minimize heat generation in the protective circuitry as disclosed herein. Heating in the protective circuitry is detrimental in two ways. Firstly, it causes helium boiloff and secondly, it generates heat in the immediate vicinity of the windings. Since the specific heat of materials at low temperatures is extremely low, even the generation of a small amount of heat may raise a portion of the windings beyond its critical temperature, and drive the coil into its normal state. However, start-up times for a coil of the type mentioned above and constructed in accordance with the present invention may be expected to be of the order of one to two hours or less.

The various features and advantages of the invention are thought to be clear from the foregoing description. Various other features and advantages not specifically enumerated will undoubtedly occur to those versed in the art, as likewise will many variations and modifications of the preferred embodiments illustrated, all of which may be achieved without departing from the spirit and scope of the invention as defined by the following claims. What is claimed is:

1. In a superconductive coil the combination comprising:

(a) a winding comprising a plurality of turns forming a plurality of layers of superconductive wire having effectively zero resistance in the superconductive state and a high resistance in the normal state;

(b) means for providing a plurality of electrical shunts across respectively different turns of said winding, said shunts comprising exterior of said winding shunting resistances having a resistance that is low compared to the resistance of said wire in the normal state; and (c) electrically nonconductive means disposed between said turns and said layers of said wire.

2. In a superconductive coil the combination comprising:

(a) a winding comprising a plurality of turns forming a plurality of layers of superconductive wire having effectively zero resistance in the superconductive state and a high resistance in the normal state;

(b) a nonsuperconductive low resistance metal coating on said wire;

(c) means for providing a plurality of electrical shunts across respectively different turns of said winding, each said shunt comprising a nonsuperconductive resistive circuit external of said winding; and (d) an electrically nonconductive coating on and covering said metal coating.

3. In a superconductive coil the combination comprising:

(a) a winding comprising a plurality of turns forming a plurality of layers of superconductive wire having effectively zero resistance in the superconductive state and a high resistance in the normal state;

(b) a nonsuperconductive low resistance metal coating on said wire;

(c) means for providing a plurality of electrical shunts across respectively different turns of said wire, each said shunt comprising a nonsuperconductive resistive circuit external of said winding;

(d) an electrically nonconductive coating on and covering said metal coating; and (e) means comprising cylindrical low resistance, inductive shields of sheet material disposed between at least two adjacent layers of said winding and extending substantially the radial and axial length of said winding for inhibiting an increase in the flow of current in said winding due to inductive coupling between segments when a portion of said wire goes normal.

4. The combination as defined in claim 3 wherein said shields comprise at least part of a resistive electrical path to current induced therein.

5. The combination as defined in claim 3 wherein each said shield comprises an open circuited electrical path to current induced therein and additionally including:

(a) circuit means including electrically resistive means for completing said electrical path.

6. The combination as defined in claim 5 wherein said circuit means for completing said electrical path comprises switching means for connecting a high resistance in series with said shields during start up of said coil and at least a low resistance in series with said shields during shut down of said coil.

7. The combination as defined in claim 5 wherein said circuit means for completing said electrical path comprises a diode poled to provide a high resistance in series with said shields during start up and a low resistance in series with said shields during shut down of said coil.

8. The combination as claimed in claim 3 wherein said shunts additionally include means for serially connecting a high resistance to current flow in each of said shunts during start up and a low resistance to current flow in each of said shunts during shut down of the coil.

9. The combination as defined in claim 3 wherein said shunts additionally include a diode poled to serially provide a high resistance in each of said shunts during start up and a low resistance in each of said shunts during shut down of said coil.

References Cited by the Examiner

UNITED STATES PATENTS

| | | | |
|---|---|---|---|
| 2,389,082 | 11/1945 | Rhoads | 317—157 X |
| 3,023,325 | 2/1962 | Brennemann | 307—88.5 |
| 3,093,749 | 6/1963 | Dillingham | 307—88.5 |
| 3,109,963 | 11/1963 | Geballe | 317—123 |
| 3,129,359 | 4/1964 | Kunzler | 317—123 |
| 3,142,029 | 7/1964 | Keen et al. | 336—84 |
| 3,176,195 | 3/1965 | Boom et al. | 317—123 |
| 3,177,408 | 4/1965 | Mills et al. | 317—123 |

STEPHEN W. CAPELLI, *Primary Examiner.*

SAMUEL BERNSTEIN, *Examiner.*

D. YUSKO, *Assistant Examiner.*